(No Model.)
M. T. WHITE.
SOD CUTTER.
No. 433,224. Patented July 29, 1890.
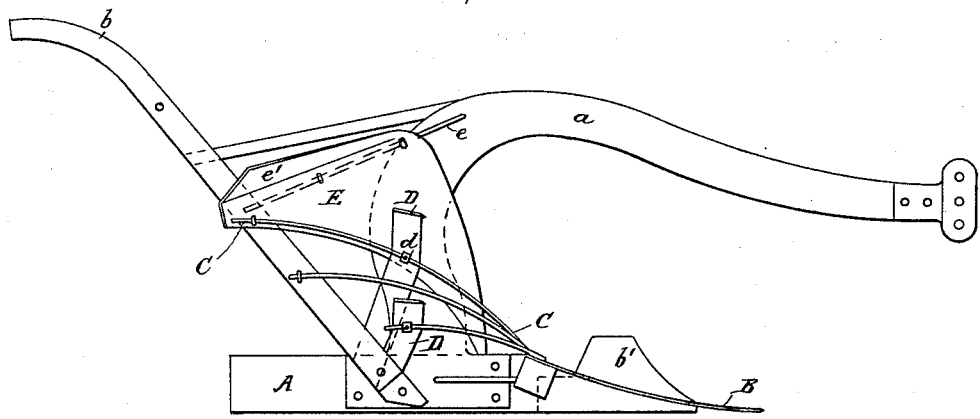
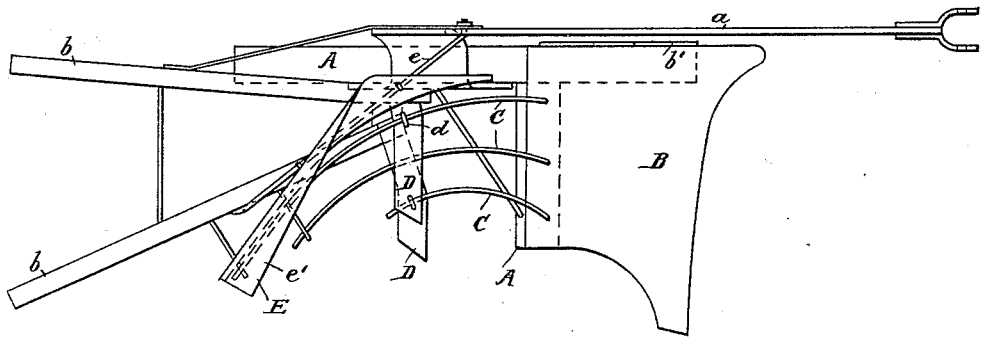
WITNESSES
O. G. Benjman
Geo. L. Wheelock
INVENTOR
Maston T. White
by Herbert W. T. Jenner
Attorney
THE NORRIS PETERS CO., PHOTO-LITHO., WASHINGTON, D. C.

UNITED STATES PATENT OFFICE.

MASTON TIMOTHY WHITE, OF WASHBURN, TEXAS.

SOD-CUTTER.

SPECIFICATION forming part of Letters Patent No. 433,224, dated July 29, 1890.

Application filed May 3, 1890. Serial No. 350,496. (No model.)

*To all whom it may concern:*

Be it known that I, MASTON TIMOTHY WHITE, a citizen of the United States, residing at Washburn, in the county of Armstrong and State of Texas, have invented certain new and useful Improvements in Sod-Cutters; and I do hereby declare the following to be a full, clear, and exact description of the invention, such as will enable others skilled in the art to which it appertains to make and use the same.

This invention relates to plows used for cutting the sod on prairie lands; and it consists in the novel construction and combination of the parts hereinafter fully described and claimed, whereby the cut sod is divided longitudinally into separate portions and turned over clear of the plow.

In the drawings, Figure 1 is a side view of the sod-cutter, and Fig. 2 is a plan view of the same from above.

A is the frame of the plow provided with the beam $a$ for drawing it along and the handle-bars $b$, secured to the said frame for guiding it.

B is a horizontal blade secured to the front of the frame, and $b'$ is a vertical blade secured to one side of the horizontal blade for cutting the sod. All these parts may be of any approved form commonly used for cutting sod in the usual manner, and may be varied in many ways.

C are curved rods secured at their front ends to the rear of blade B and extending upwardly and outwardly away from the beam, having their rear ends secured to one of the handle-bars, if desired, to relieve the strain upon them.

D are curved cutting-blades secured to the handle-bars at one end and having their middle parts secured to the rods C by eyebolts $d$. The said eyebolts may be slid upon the bars to adjust the exact position of the blades, and the said blades are curved upwardly and outwardly, and are arranged at substantially a right angle to the said bars.

E is a fender formed of a plate of metal and secured to the frame and to the bar or brace $e$, which extends diagonally between the beam and the outer handle-bar. The fender is arranged nearly vertical and substantially in line with the diagonal brace-rod, and is provided with the forwardly-bent flange $e'$ at its top edge.

The sod which is cut by the horizontal blade slides up the curved guide-bars, and is divided longitudinally into separate portions by contact with the curved blades D. The flanged fender prevents the sod from rising too high up the guide-rods, and throws over all the loose soil and rubbish clear of the handle-bars, and the guide-bars, blades, and fender together turn over the separate portions into which the sod is divided and throw them to one side, thus dispensing with the subsequent use of a disk-harrow.

What I claim is—

1. The combination, with a sod-cutter provided with a horizontal blade, of a series of upwardly and outwardly curved guide-rods secured behind the said blade, the cutting-blades secured to said rods for dividing the cut sod into separate portions, and the fender secured above and behind the said blades, substantially as and for the purpose set forth.

2. The combination, with a sod-cutter comprising the frame, the horizontal blade, the beam, the handle-bars, and the brace-rod connecting the said beam with the outer handle-bar, substantially as set forth, of the upwardly and outwardly curved guide-rods secured to the rear of the said blades, the curved cutting-blades secured to said rods for dividing the cut sod into separate portions, and the fender provided with a forwardly-bent flange at its upper edge and secured to the said brace-rod diagonally of the machine and behind and above the said blades, substantially as shown and described.

In testimony whereof I affix my signature in presence of two witnesses.

MASTON TIMOTHY WHITE.

Witnesses:
G. L. POOL,
C. E. PUCKETT.